(12) United States Patent
Redin Miqueleiz (10) Patent No.: US 12,331,773 B2
(45) Date of Patent: Jun. 17, 2025

(54) APPARATUS AND METHOD FOR PROVIDING A SECURE TENSION CONNECTION

(71) Applicant: Siemens Gamesa Renewable Energy Innovation & Technology S.L., Sarriguren (ES)

(72) Inventor: Juan Redin Miqueleiz, San Jose, CA (US)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 0 days.

(21) Appl. No.: 17/166,209

(22) Filed: Feb. 3, 2021

(65) Prior Publication Data

US 2021/0262503 A1    Aug. 26, 2021

(30) Foreign Application Priority Data

Feb. 20, 2020 (EP) ..................................... 20380007

(51) Int. Cl.
*F16B 31/04* (2006.01)
*F16B 5/06* (2006.01)

(52) U.S. Cl.
CPC ............ *F16B 5/0621* (2013.01); *F16B 31/04* (2013.01); *F05B 2260/30* (2013.01); *Y02E 10/72* (2013.01)

(58) Field of Classification Search
CPC ............................... F16B 31/04; F16B 43/009
USPC .................. 411/14.5, 916, 917, 546, 535
See application file for complete search history.

(56) References Cited

U.S. PATENT DOCUMENTS

| | | | | |
|---|---|---|---|---|
| 3,154,006 A | * | 10/1964 | Novak | F16B 31/043 411/432 |
| 3,285,568 A | * | 11/1966 | Biach | F16B 43/007 416/207 |
| 4,622,730 A | * | 11/1986 | Steinbock | B21B 27/035 470/57 |
| 5,083,889 A | | 1/1992 | Steinbock | |
| 5,527,015 A | * | 6/1996 | Percival-Smith | F16B 31/043 254/29 A |
| 6,199,453 B1 | * | 3/2001 | Steinbock | B23P 19/068 81/57.38 |
| 6,263,764 B1 | | 7/2001 | Steinbock | |
| 6,685,406 B2 | * | 2/2004 | Whitney | F16B 31/04 411/917 |

(Continued)

FOREIGN PATENT DOCUMENTS

| | | |
|---|---|---|
| CN | 201100300 Y | 8/2008 |
| CN | 101799032 A | 8/2010 |

(Continued)

OTHER PUBLICATIONS

European Search Report issued on Jul. 1, 2020 for application No. 20380007.3.

*Primary Examiner* — Flemming Saether
(74) *Attorney, Agent, or Firm* — Schmeiser, Olsen & Watts LLP (57) ABSTRACT

Provided is an apparatus for providing a secure tension connection, the apparatus including a fastener) with a flange for interaction with a shank, a plurality of lifting elements, and a plurality of spacers. Also provide is a wind turbine with such an apparatus, a tool for securing an apparatus and a method for providing a secure tension connection.

17 Claims, 4 Drawing Sheets

(56) References Cited

U.S. PATENT DOCUMENTS

| | | | | |
|---|---|---|---|---|
| 8,266,781 | B2* | 9/2012 | Bucknell | B23P 19/067 |
| | | | | 411/917 |
| 8,328,482 | B2* | 12/2012 | Britton | B25B 29/02 |
| | | | | 411/917 |
| 8,832,921 | B2* | 9/2014 | Marks | F16B 39/12 |
| | | | | 269/309 |
| 10,634,182 | B2* | 4/2020 | Jeon | F16B 43/007 |
| 2014/0245869 | A1 | 9/2014 | Rice | |
| 2020/0023477 | A1 | 1/2020 | Hohmann et al. | |

FOREIGN PATENT DOCUMENTS

| | | | |
|---|---|---|---|
| CN | 204213149 U | | 3/2015 |
| CN | 207656587 U | | 7/2018 |
| DE | 103 05 712 | * | 8/2004 |
| EP | 1105250 A2 | | 6/2001 |
| GB | 1277610 A | | 6/1972 |
| WO | WO 9961196 | | 12/1999 |
| WO | WO 2008090244 A1 | | 7/2008 |
| WO | WO 2015084467 A2 | | 6/2015 |

* cited by examiner

APPARATUS AND METHOD FOR PROVIDING A SECURE TENSION CONNECTION

CROSS-REFERENCE TO RELATED APPLICATIONS

This application claims priority to European Application No. 20380007.3, having a filing date of Feb. 20, 2020, the entire contents of which are hereby incorporated by reference.

FIELD OF TECHNOLOGY

The following relates to an apparatus, a tool, and to a method for providing a secure tension connection. Further, the following relates to a wind turbine.

BACKGROUND

Mechanical fasteners used for providing a tension connection such as bolts or nuts face intense external loads that are distributed in a so-called "compression cone" in the fastener. It is known that a compression cone in a fastener changes with a so-called "preload" on the fastener.

Current technology focusses on maximizing preload by mechanical tensioners that are arranged in an outer circumference of a fastener. The tensioners are pressed on a base washer in order to provide for the preload on the fastener.

However, installing tensioners is prone to failures by either technician boredom or mistake and is hence susceptible not to assure an accomplishment of a target preload.

Moreover, although known mechanical tensioners are extremely insensitive to external loading, they are prone to external influences such as weather and, therefore, need to be maintained and/or inspected on a regular basis.

Document U.S. Pat. No. 5,083,889 A describes a fastener apparatus to compress a support member. The fastener comprises a plurality of jack bolts threadedly engaged with holes in a flange of the fastener extending from the flange and through the holes to stress an elongated shank part of the fastener through torquing the jack bolts for applying compressive reaction forces on a support member.

SUMMARY

An aspect relates to a stable and reliable tension connection for large fasteners, such as metric bolts M52 and beyond, for example. More specifically, it is an aspect to provide a maintenance free connection for at least two components in a wind-turbine.

Thereby, the features and details described in connection with the apparatus apply in connection with the wind turbine and the method for providing a secure tension connection, so that the disclosure of the individual aspects of embodiments of the invention can be referred to one another.

According to a first aspect of embodiments of the invention, the above described aspect is solved by an apparatus for providing a secure tension connection. The apparatus comprises a fastener with a flange for interaction with a shank, a plurality of lifting elements, and a plurality of spacers. The flange comprises a plurality of spaced-apart holes overlying a support member. Each lifting element of the plurality of lifting elements is configured to engage in a hole of the plurality of holes, to extend from the holes and to abut against the support member under an applied torque in order to tension the fastener by forming a gap between the support member and the flange. Additionally, each spacer of the plurality of spacers is configured to engage into the gap between the support member and the flange, such that tension forces applied on the fastener are maintained after the plurality of lifting elements are removed from the fastener.

In the context of embodiments of the present invention, a tension connection is a connection between a plurality of elements involving at least one fastener that is secured in at least one of the plurality of elements by a tension force.

In the context of embodiments of the present invention, a fastener is an element that is configured to be connected to at least one element in a tension connection. In particular, a fastener may be a bolt or a nut and a shank, such as a stud, for example. A fastener comprises a flange, which may be a head of a bolt or a nut in a nut and stud arrangement.

In the context of embodiments of the present invention, a lifting element is a structure that is configured for engagement with a fastener and to provide a load on a flange of the fastener by abutting against a support member, such as a washer, for example. In particular, a lifting element, may be bolt, a stud or any other structure, that can be inserted in a hole of a fastener to provide a load on a flange of the fastener by abutting against a support member. A lifting element is a tool used to mechanically stress a fastener. A lifting element does not remain in the fastener in a final connection arrangement. A lifting element may be threadedly engaged with holes in a flange of a fastener extending from the flange and through the holes to stress an elongated shank part of the fastener through torquing the lifting elements for applying compressive reaction forces on a support member.

In the context of embodiments of the present invention, a spacer is an element that is configured to be inserted in a gap between a fastener and a support member. A spacer may be a plate of metal or any other material. A spacer may have any shape and is preferably flat. In particular, a spacer may be shaped in a way that enables a form-fit connection in a gap between a fastener and a support member. A spacer may be a part of a group of spacers that are used to fill a gap between a fastener and a support member. In particular, a spacer may be semi-circle shaped. Once a gap is locked by a number of spacers, a preload on the fastener is maintenance free secured, in particular established.

A fastener that is inserted in a gap between a flange of a fastener and a support member applies for compressive reaction forces on both, the flange and the support member.

In the context of embodiments of the present invention, a support member is a structure that contacts lifting elements that extend out of a flange of a fastener or spacers that are inserted in a gap between a support member and a flange. In particular, a support member may be a washer, such as a hardened base washer. Alternatively, a support member may also be a structure of elements to be connected with a fastener, such as a connection area providing a bearing for receiving the fastener.

The apparatus described herein is based on the principle that spacers are inserted in a gap between a flange of a fastener and a support member. The spacers provide for a load, i.e. a tension force, on the fastener and the support member. In particular, the spacers assure a large compression cone in a connection between the fastener, a support member, and a connection element that receives the fastener.

The spacer of the apparatus described herein provides a maximum compression cone possible. In particular, the compression cone may extend to the very edge of a flange of the fastener of the apparatus described herein.

The spacer of the apparatus described herein may be flexible in order to provide a suspension that isolates a main body of a fastener, such as a shank, from external influences. By this isolation, only elastic post-settling relaxations can take place to reduce a preload achieved. These relaxations are minor in standard bolting but are almost eradicated using the apparatus described herein due to a very small flange contact stress level and a proper fit of the apparatus on a support member due to a very high preload level.

Since the apparatus described herein minimizes external loads on a main body of the fastener, a ratio of a height of a flange of the fastener and a shank of the fastener may be constructed very large, such as 1:8 or 1:10. Such a large ratio of flange and shank or "oversized head" eradicates self-loosening dynamics of a corresponding fastener.

Since the apparatus described herein assures a large compression cone, a connection between a plurality of elements may be established by a reduced number of fasteners and/or smaller fastener sizes compared to known fasteners.

The apparatus described herein is insensitive to a technician's performance since a correct arrangement can be verified easily by visual inspection.

The apparatus described herein is based on a maintenance free concept that can be installed without any need for preload measurement at tightening, which is a cost-intensive process.

For receiving the lifting elements, the flange of the fastener of the apparatus described herein has a number of holes, which may have bearings for engagement with the lifting elements.

According to an example, the spacers of the plurality of spacers have at least one opening for receiving at least one lifting element.

By using spacers that have an opening for receiving at least one lifting element, the spacers may be installed in a gap between a fastener and a support member at a time where a lifting element providing the gap, is still present in the gap. In other words, an opening in a spacer enables the spacer to be arranged around a particular lifting element without any need to remove the lifting element for installing the spacer. Alternatively, the spacer may be elastic, such that the spacer changes its shape after the lifting element is removed from the gap.

According to an example, the holes of the plurality of holes are spaced about an outer peripheral part of the flange.

The flange of the fastener of the apparatus described herein may have an inner part, which may be a connection area for a stud or a shank, and an outer part, which protrudes the inner area in order to provide a tension force that secures the fastener at a connection element. To provide the tension force, lifting elements are brought into engagement with holes in the outer part in a first process. In a second process, spacers are inserted in a gap between the fastener and a support member created by the engagement of the lifting elements in the holes. In a third process, the lifting elements are removed from the outer part of the flange.

According to an example, the apparatus comprises at least one cover, wherein the cover is configured to cover at least one of the plurality of holes after the lifting elements of the plurality of lifting elements are removed from the fastener.

A cover that is used to cover a hole in the fastener of the apparatus described herein secures the holes from external influences such as water or ice and, therefore, ensures a maintenance free connection. A cover can be made from plastic, metal or any other suitable material. In particular, a cover may be shaped to contact-fit into a hole, such that the holes are filled by the cover and the fastener is further stabilized. Thus, the cover may be a stud or a screw.

In a second aspect, embodiments of the present invention relate to a wind turbine having a plurality of components, wherein at least two components of the plurality of components are secured to each other by the apparatus described herein.

By using the apparatus described herein for connecting components of the wind turbine described herein, the fasteners of the apparatus may be chosen smaller and/or in a reduced number compared to using known fasteners. In particular, the apparatus described herein enables a connection with components that are smaller than components to be used in combination with known fasteners, which results a smaller and lighter or optimized wind turbine design.

In a third aspect, embodiments of the present invention relate to a tool for securing an embodiment of the apparatus described herein. The tool comprises a multispindle and a distance sensor. The multispindle is configured to apply a torque provided by a torque drive to the plurality of lifting elements of the apparatus until a distance between a reference point and the apparatus, measured by the distance sensor, becomes smaller than a given threshold.

The reference point may be a point on the multispindle or any other point representative of a distance between the apparatus, in particular the lifting elements of the apparatus, and the multispindle.

The tool described herein comprises a distance sensor, which may be laser sensor, an infrared sensor, a mechanical sensor or any other sensor suitable for measuring a distance between the apparatus and the multispindle.

To ensure a predetermined preload is applied on a fastener, the tool is configured to apply a torque to a plurality of lifting elements used for lifting the fastener until a distance between a reference point and the fastener, in particular a flange of the fastener, becomes smaller than a given threshold.

The threshold may be chosen depending upon the particular fastener to be secured by the tool.

For determining whether a distance between the fastener and the reference point is smaller than the threshold, the tool may comprise a control unit, such as a processor, for example. The control unit comprises a memory for storing the threshold. The control unit receives values measured by the distance sensor and compares them with a particular threshold that is relevant for a particular fastener to be secured.

The tool may be adapted to use a torque provided by a torque drive attached to the tool. Alternatively, the tool may comprise a torque drive, which may be driven manually or power driven and/or automatically.

According to an example, the tool may be adapted to drive the multispindle until a given reference distance between the multispindle and a particular fastener to be secured or a given torque is reached and to use the corresponding position of the multispindle as a reference point.

According to another example, the tool may be configured to extract the lifting elements from a particular fastener to be secured. For extraction of the lifting elements, the tool may comprise an extraction element such as a clamp or mechanism that engages with the lifting elements. Of course, if the lifting elements have bearings, a torque in the opposite direction is used for providing the gap may be applied for extraction of the lifting elements.

According to another example, the tool comprises at least one actuator for inserting the plurality of spacers in the gap between the fastener and the support member.

The actuator for inserting the plurality of spacers in the gap between the fastener and the support member may be a mechanism that is controlled independent from the multispindle. Thus, the actuator may be configured to insert the spacers in the gap when the gap is fully opened or a trigger signal, such as pushing a button by a user, is provided.

Alternatively, the actuator for inserting the plurality of spacers in the gap between the fastener and the support member may be a mechanism that is controlled or depending on an activity of the multispindle, such that the spacers are inserted in a gap or a gap section that is provided by an activity of the multispindle. Thus, the actuator and the multispindle may be used in combination to carry out a lifting protocol for inserting and extracting particular lifting elements and inserting corresponding spacers in a sequential activity until all spacers are inserted between a particular fastener and a particular support member and all lifting elements are extracted.

In a fourth aspect, embodiments of the present invention relate to a method for providing a secure tension connection. The method comprises providing an embodiment of the apparatus described herein, applying a torque to the lifting elements of the apparatus until a distance between a reference point and the apparatus becomes smaller than a given threshold and a gap is formed between the fastener and the support member of the apparatus, inserting the plurality of spacers of the apparatus in the gap, removing the plurality of lifting elements from the fastener.

The method described herein in particular serves for providing a secure tension connection using the apparatus and the tool described herein, such that with respect to the advantages of the method described herein reference is made to the advantages described with respect to the apparatus and the tool.

According to an example, particular lifting elements of the plurality of lifting elements are removed by a lifting protocol that ensures a resulting gap section corresponds to a specific shape of a particular spacer.

By using a lifting protocol, an alternate or sequential insertion of spacers in different directions or gap sections can be achieved. Such an alternate or sequential insertion ensures an evenly distribution of a preload on a particular fastener.

In another example, according to the lifting protocol at least one first lifting element is inserted in the fastener and at least one first spacer is inserted in a corresponding first gap section in a first step, and in a second step, after the first step, at least one second lifting element is inserted in the fastener and at least one second spacer is inserted in a corresponding second gap section.

The lifting protocol may be used to carry out a sequence for inserting the lifting elements, inserting the corresponding spacers and extracting the lifting elements after the spacers have been inserted. The sequence may be clockwise, anti-clockwise or diagonal offset, for example.

The method disclosed herein enables a manufacturing of a wind turbine with apparatus according to embodiments of the present invention that provides for a secure connection arrangement. By using the method disclosed herein, a wind turbine is cost effective to install with maintenance free connections.

BRIEF DESCRIPTION

Some of the embodiments will be described in detail, with references to the following Figures, wherein like designations denote like members, wherein.

DETAILED DESCRIPTION

Figure 1:
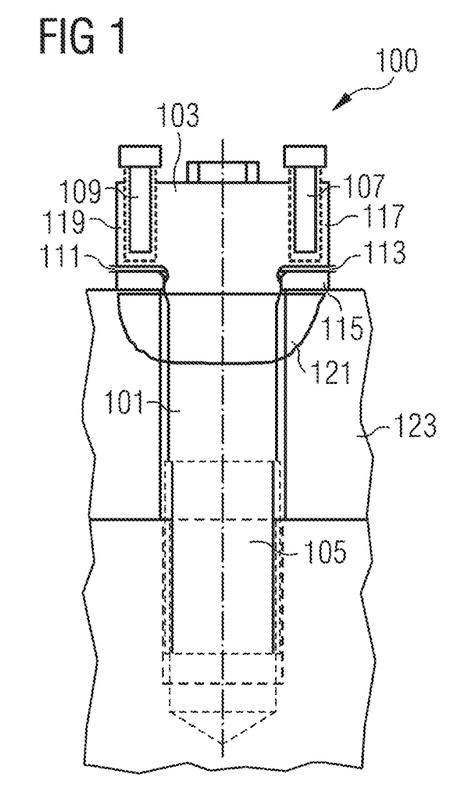
FIG. 1 an apparatus according to an embodiment.

In FIG. 1, an apparatus 100 is shown. The apparatus 100 comprises a fastener 101 with a flange 103 for interaction with a shank 105, lifting elements 107 and 109, spacers 111 and 113, and a support member 115.

Figure 5:
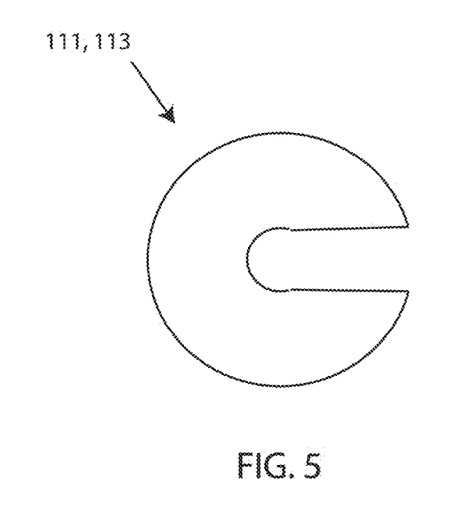
FIG. 5 is an embodiment of a spacer.

In order to provide a secure tension connection between the fastener 101 and a connection element 123, the fastener is inserted in the connection element 123. Afterwards, the lifting elements 107 and 109 are tightened such that the lifting elements 107 and 109 pass through holes 117 and 119 in the fastener 101, contact the support member 115 and provide a preload on the fastener 101 that results in a gap between the fastener 101 and the support member 115. The spacers 111 and 113 are inserted in the gap to maintain the preload before the lifting elements 107 and 109 are then removed from the fastener 101. According to an example shoqn in FIG. 5, the spacers 111, 113 have at least one opening for receiving at least one lifting element.

The spacers 111 and 113 sustain the tension for a tension force on the fastener 101 and/or the support member 115 that secures the fastener 101 in its position.

Further, the spacers 111 and 113 provide for a suspension effect that results in a maximum compression cone 121 that extends to the very edge of the flange 103.

Figure 2:
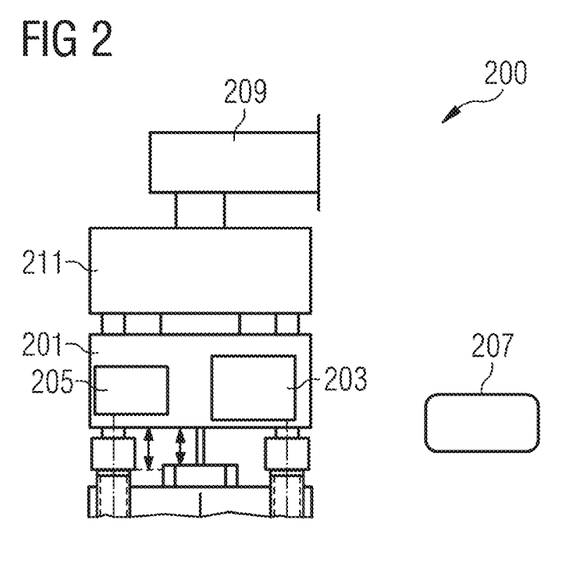
FIG. 2 a tool according to an embodiment.

In FIG. 2, a tool 200 is shown. The tool 200 comprises a multispindle 201 and a distance sensor 203.

The tool 200 is used for providing a secure tension connection of the apparatus 100 as shown in FIG. 1 and a connection element.

The multispindle 201 is configured to apply a torque provided by a torque drive to the lifting elements 107 and 109 of the apparatus 1000, for example, until a distance between a reference point and the apparatus 100, measured by the distance sensor 203, becomes smaller than a given threshold.

Optionally, the tool 200 comprises a control unit 205 for controlling the multispindle 201 and/or an optional actuator 207 for inserting the spacers 111 and 113, for example.

The control unit 205 may use measurement data provided by the distance sensor 203 in order to control the multispindle 201.

Optionally, the tool 200 comprises a torque drive 209 or an interface 211 for connecting with an external torque drive. The torque provided by the torque drive 209 may be multiplied by an optional torque multiplier 211.

Figure 3:
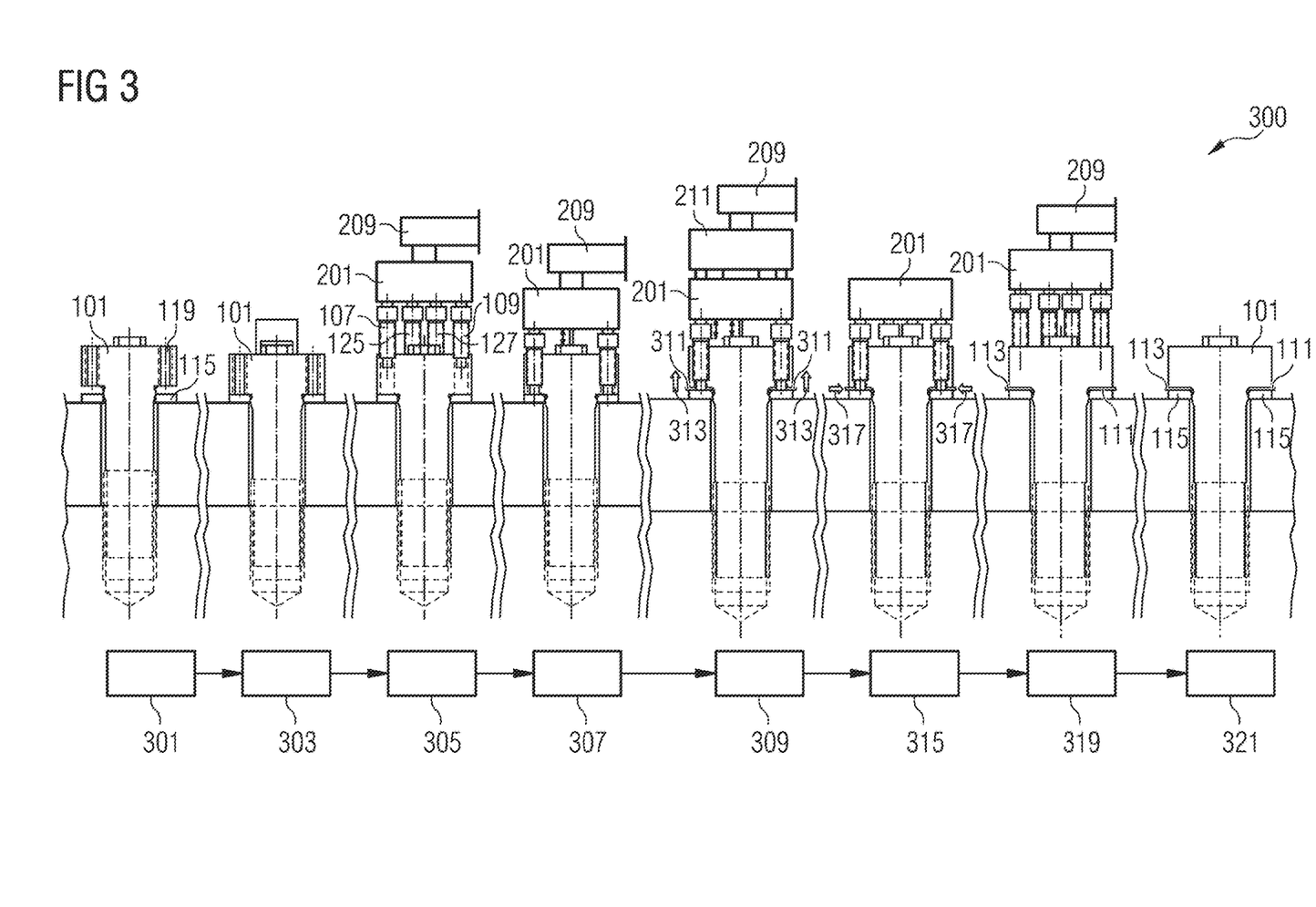
FIG. 3 a method according to an embodiment.

In FIG. 3, a method 300 is shown.

In a providing step 301, the method 300 starts with inserting a fastener, such as the fastener 101 shown in FIG. 1 in the connection element 123.

In a torquing step 303, a torque is provided on the fastener 101 to tighten the fastener 101 in the connection element 123. The torque may be a given torque, such as 190 Nm, for example.

In an insertion step 305, a tool, such as the tool 200 shown in FIG. 2 is used to insert lifting elements 107, 109, 125 and 127 in the fastener 101. Thus, the multispindle 201 is connected to the lifting elements 107, 109, 125 and 127 in order to apply a torque on them and to push the lifting elements 107, 109, 125 and 127 into the fastener 101.

In a leveling step 307, the lifting elements 107, 109, 125 and 127 are further pushed into the fastener 101 until a distance between the multispindle 201 and the fastener 101 equals a given reference distance.

In a loading step 309, a preload is applied in the fastener 101 by pushing the lifting elements 107, 109, 125 and 127 on the support member 115, such that the fastener 101 lengthens and a gap 311 is formed between the flange 103 of the fastener 101 and the support member 115, as indicated by arrows 313.

In loading step 309, an optional torque multiplier 213 may be used to provide for a high torque on the lifting elements 107, 109, 125 and 127.

In an insertion step 315, the spacers 111 and 113 are inserted in the gap 311. The spacers 111 and 113 may be arranged around the lifting elements 107, 109, 125 and 127, as indicated by arrows 317. Afterwards, the lifting elements 107, 109, 125 and 127 are disengaged from the support member 115. Alternatively, the lifting elements 107, 109, 125 and 127 may be sequentially disengaged from the support member 115, such that after disengagement of a particular lifting element 107, 109, 125 or 127 a particular spacer 111 or 113 is inserted and another lifting element 107, 109, 125 or 127 is disengaged from the support member 115.

In a removing step 319, the lifting elements 107, 109, 125 and 127 are removed from the fastener 101. Thus, the fastener 101 is kept in its position by a preload provided by the spacers 111 and 113.

In an optional covering step 321, holes in the fastener 101, remaining after removal of the lifting elements 107, 109, 125 and 127, are covered by a cover.

Figure 4:
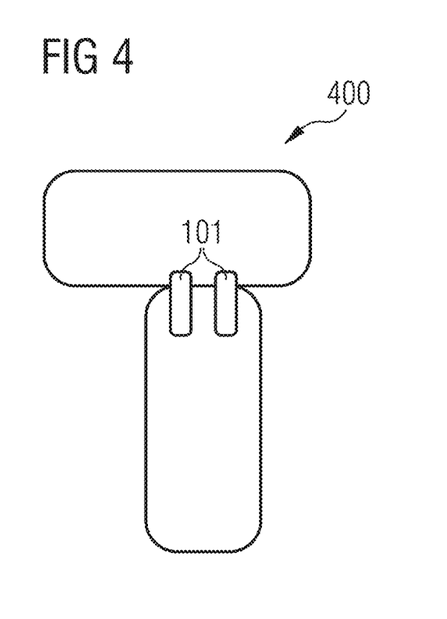
FIG. 4 a wind turbine according to an embodiment.

In FIG. 4, a wind turbine 400 is shown. The wind turbine 400 comprises a nacelle 403 and a tower 405. The nacelle 403 is secured at the tower 405 by a plurality of fasteners 101 as shown in FIG. 1.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An apparatus for providing a secure tension connection, the apparatus comprising:
   a fastener with a flange for interaction with a shank, the flange having an inner part that is a connection area for the shank, and an outer part that protrudes from the inner part to form an outer edge of the flange; and
   a plurality of spacers having an opening;
   wherein the flange comprises a plurality of spaced-apart through holes overlying a support member, the plurality of spaced-apart through holes configured to allow lifting elements to pass through the spaced-apart through holes from a top side of the flange and extend a distance from a bottom side of the flange to contact the support member;
   wherein the lifting elements are configured to contact the support member under an applied torque thereby tensioning the fastener by forming a gap between the support member and the flange, and each spacer of the plurality of spacers is inserted within the gap;
   wherein the spaced-apart through holes are configured to allow the lifting elements to be removed from the top side of the flange, and, when the lifting elements are removed from the plurality of spaced-apart through holes of the flange, tension forces applied on the fastener are maintained by the plurality of spacers and the bottom side of the flange physically contacts the plurality of spacers;
   wherein the fastener is a bolt, the flange is a head of the bolt, and a bottom end of the shank, which is distal to the head is located within a connection element configured to receive the fastener;
   wherein the plurality of spacers reside underneath the flange from the inner part of the flange to at least the outer edge of the flange;
   wherein the plurality of spacers are flexible to provide a suspension that isolates the shank from external influences.

2. The apparatus according to claim 1, wherein the plurality of spaced-apart holes are spaced about an outer peripheral part of the flange.

3. The apparatus according to claim 1, further comprising at least one cover, wherein the at least one cover is configured to cover at least one of the plurality of spaced-apart holes after the plurality of lifting elements are removed from the fastener.

4. A wind turbine comprising a plurality of components, wherein at least two components of the plurality of components are secured to each other by the apparatus according claim 1.

5. A tool for securing the apparatus according to claim 1, wherein the tool comprises:
   a multispindle; and
   a distance sensor;
   wherein the multispindle is configured to apply a torque provided by a torque drive to the plurality of lifting elements of the apparatus until a distance between a reference point and the apparatus, measured by the distance sensor, becomes smaller than a given threshold.

6. The tool according to claim 5, wherein the tool comprises at least one actuator for inserting the plurality of spacers in the gap between the fastener and the support member.

7. The tool according to claim 5, further comprising a control unit, wherein the control unit is adapted to drive the multispindle until a given reference distance between the multispindle and the fastener of the apparatus or a given torque is reached and to use the reached position of the multispindle as a reference point.

8. The tool according to claim 5, wherein the tool) comprises at least one extraction element for extraction of the plurality of lifting elements from the fastener of the apparatus.

9. The apparatus according to claim 1, wherein the opening of the spacers allows each spacer to be inserted within the gap while the lifting elements are present in the gap.

10. The apparatus according to claim 1, wherein the opening of the spacers receives the lifting element so that the spacers are arranged around the lifting element without any need to remove the lifting element for installing the spacers.

11. The apparatus according to claim 1, wherein a shape of the plurality of spacers enables a form-fit connection in the gap between the fastener and the support member.

12. The apparatus according to claim 11, wherein the shape of the plurality of spacers is a flat metal plate.

13. The apparatus according to claim 12, wherein the flat metal plate is semi-circle shaped.

14. The apparatus according to claim 1, wherein the connection element is not a nut.

15. A method for providing a secure tension connection, the method comprising:

providing an apparatus comprising: a fastener with a flange for interaction with a shank, the flange having an inner part that is a connection area for the shank, and an outer part that protrudes from the inner part to form an outer edge of the flange; and a plurality of spacers having an opening; wherein the flange comprises a plurality of spaced-apart through holes overlying a support member, the plurality of spaced-apart through holes configured to allow lifting elements to pass through the spaced-apart through holes from a top side of the flange and extend a distance from a bottom side of the flange to contact the support member; wherein the lifting elements are configured to contact the support member under an applied torque thereby tensioning the fastener by forming a gap between the support member and the flange, and each spacer of the plurality of spacers is inserted within the gap; wherein the spaced-apart through holes are configured to allow the lifting elements to be removed from the top side of the flange, and, when the lifting elements are removed from the plurality of spaced-apart through holes of the flange, tension forces applied on the fastener are maintained by the plurality of spacers and the bottom side of the flange physically contacts the plurality of spacers; wherein the fastener is a bolt, the flange is a head of the bolt, and a bottom end of the shank, which is distal to the head is located within a connection element configured to receive the fastener; wherein the plurality of spacers reside underneath the flange from the inner part of the flange to at least the outer edge of the flange; wherein the plurality of spacers are flexible to provide a suspension that isolates the shank from external influences;

applying a torque to the plurality of lifting elements of the apparatus until a distance between a reference point and the apparatus becomes smaller than a given threshold and a gap is formed between the fastener and the support member;

inserting the plurality of spacers of the apparatus in the gap; and removing the plurality of lifting elements from the fastener.

16. The method according to claim 15, wherein at least one lifting element (of the plurality of lifting elements is removed by a lifting protocol that ensures a resulting gap section corresponds to a specific shape of a spacer.

17. The method according to claim 16, wherein according to the lifting protocol at least one first lifting element is inserted in the fastener and at least one first spacer is inserted in a corresponding first gap section in a first step, and in a second step, after the first step, at least one second lifting element is inserted in the fastener and at least one second spacer is inserted in a corresponding second gap section.

* * * * *